United States Patent [19]

Ahmad et al.

[11] Patent Number: 4,644,988

[45] Date of Patent: Feb. 24, 1987

[54] HIGH PERFORMANCE TIRE AND TREAD COMPOUND FOR IT

[75] Inventors: Shamim Ahmad, Canal Fulton; Larry A. Kraus, Stow; Paul C. Staab, Akron, all of Ohio

[73] Assignee: The B.F. Goodrich Company, Akron, Ohio

[21] Appl. No.: 575,431

[22] Filed: Jan. 31, 1984

[51] Int. Cl.[4] .................... B60C 11/00; C08L 7/00
[52] U.S. Cl. .................... 152/209 R; 524/496
[58] Field of Search ........... 152/209 R, 209 A, 209 B, 152/209 NT, 209 WT, 330 R, 374; 524/495, 496; 423/445, 449, 450

[56] References Cited

U.S. PATENT DOCUMENTS

| | | | |
|---|---|---|---|
| 4,154,277 | 5/1979 | Sato et al. | 152/209 R |
| 4,193,437 | 3/1980 | Powell | 524/496 |
| 4,350,621 | 9/1982 | Bond et al. | 152/209 R |
| 4,477,621 | 10/1984 | Sato et al. | 152/209 R |

FOREIGN PATENT DOCUMENTS

| | | | |
|---|---|---|---|
| 0124047 | 9/1979 | Japan | 524/496 |
| 6093738 | 7/1981 | Japan | 524/496 |
| 0034141 | 2/1982 | Japan | 524/495 |

OTHER PUBLICATIONS

Cabot Corporation, Carbon Black Technical Service Report, "Vulcan 10H", TG-438, W. A. Jones, Mass., no date.

Primary Examiner—Lois E. Boland
Attorney, Agent, or Firm—Harry F. Pepper, Jr.

[57] ABSTRACT

A predominantly styrene-butadiene copolymer rubber (SBR) tire tread compound may be reinforced with a special high structure carbon black designated herein as a N103, having a relatively high volatiles content (as indicated by its iodine number), and a superfine particle size smaller than about 20 nanometers (nm), a DBPA greater than 120 cm$^3$/100 g carbon black, and an $I_2$ No in the range from 130–160 mg/g, in an oil extended tread compound in which there is at least 30 parts of processing oil per 100 parts of rubber; the presence of this N103 black in a major amount relative to the total amount of high structure black, is essential.

12 Claims, 2 Drawing Figures

HIGH PERFORMANCE TIRE AND TREAD COMPOUND FOR IT

BACKGROUND OF THE INVENTION

The "handling characteristics" of a vehicle's tire are of paramount important in a "high performance" tire. By "handling characteristics" we refer to a combination of individually categorized characteristics referred to in greater detail hereinafter, which are not readily observed by an average driver in an average automobile at legal highway speeds in this country. Such handling characteristics are deliberately designed for a specific purpose, including for off-the-highway high speed driving, as on a race track, or for law enforcement patrol cars, and categorically not designed for use on the average highway under normal circumstances.

It was desired to provide improved handling characteristics without noticeable loss in wet and dry traction, and treadwear resistance. Since improvement in one of the foregoing properties generally results in a concomitant denigration of at least one of the others, this long-sought-after goal in a high performance tire seemed unattainable.

This invention is related to a high performance pneumatic, tubeless radial tire with long-sought-for characteristics, and more particularly to the tread composition for such a tire.

It is well known that high surface area, small particle size blacks provide greater reinforcement, as evidenced by improved resistance to abrasion, tensile strength and tear properties; concomitantly, superfine blacks also provide higher hysteresis and poorer dynamic performance attributable to high heat build-up, both adverse properties. In addition it is known that larger size blacks provide reduced rolling resistance and poorer traction, both wet and dry. This combination of adverse properties, namely high heat build-up and poorer dynamic performance resulting in increased rolling resistance has never been correlated to the handling characteristics of a tire. More importantly, it was not known that surface activity, which refers generally to the manner in which the black interacts with different compounding ingredients, was closely related to "handling", traction and abrasion (wear) resistance.

In the recent past, the emphasis has been on reduction of rolling loss for lower fuel consumption without sacrificing wear resistance. Ignoring changes in tire construction to aid in this respect, several approaches have been taken towards attaining this goal, as taught in U.S. Pat. Nos. 3,824,206; 4,224,197; and 4,281,703, inter alia; and United Kingdom patent applications Nos. GB 2,082,486A and 2,057,455A. None was concerned with deliberately increasing the rolling resistance and heat buildup in a tire, which is what we have done.

In currently marketed predominantly styrene-butadiene copolymer rubber ("SBR") tires, carbon black is the essential rubber reinforcing ingredient. As such a wide variety of blacks are used in the treads of pneumatic radial and other tires, but a black also provides essential traction, as do other reinforcing ingredients such as silica; but there is no known way to predict the effects of the use of a particular black, which effects must therefore be determined by experiment. The choice of the type and amount of carbon black in the tread compound influences many performance properties of the tire.

There are about seven main classifications of carbon black, including in decreasing order of market share, but not of importance, the following: HAF (N300); GPF (N600); FEF (N500); SRF (N700); ISAF (N200); Thermal; and SAF (N100). This invention is related to the use of SAF type blacks which currently constitute about 10% of the carbon black market for tires. These N100 blacks are currently used in tires where excellent abrasion resistance and tear properties are of paramount importance, as for example in off-the-road tires for all types of vehicles.

The distinction between grades of carbon blacks are based on three main factors which are broadly classified as follows:

1. Particle size, particularly as it relates to surface area.
2. Structure, a general measure of particle-to-particle association.
3. Chemical composition of the surface, or surface activity.

Surface area, generally measured by iodine number ("$I_2$ No."), and structure, generally a measure of void volume, in turn measured by dibutyl phthalate absorption ("DBPA"), are key attributes which characterize a carbon black.

This invention relates to the exploitation of a particular property of a SAF carbon black having high structure and a surface area with a unique level of volatiles, identified with a relatively lower $I_2$ No. than other commercially available SAF blacks. Such blacks, when substituted for other blacks conventionally used in tread compounds usually used, was not expected to provide such an outstanding combination of desirable properties, particularly handling and traction, as we found by experimentation with numerous tread compounds.

A detailed discussion of some of the foregoing considerations is presented in an article titled "The Effects of Carbon Black and Other Compounding Variables on Tire Rolling Resistance and Traction" by W. M. Hess and W. K. Klamp, *Rubber Chemistry and Technology*, Vol. 56, No. 2 May–June 1983. A predominantly SBR tire with minor amounts of polybutadiene rubber (BR) essentially all of which is cis-, and/or natural rubber (NR), and an oil loading of no more than 70/40 black-/oil ratio with a high structure N220 black, was used to study the effects of carbon black and other variables on tire rolling resistance and traction, among other objectives. The blacks tested varied in nitrogen surface area ($N_2SA$), ASTM tint, and DBPA.

It has also been recognized that the physico-chemical nature of the carbon black particles' surface, and particularly, the nature of the carbon atoms at the surface of a particle, may affect rubber reinforcement. Similarly the chemical nature of the particles' surface, and particularly the presence of oxygen at the surface, along with phenolic, ketonic and carboxylic groups, inter alia which are known to be present on the surface, affect the crosslinking of the rubber and its vulcanized properties. See *Rubber Technology and Manufacture*, edited by C. M. Blow, p 180, CRC Press, International Scientific Series (1971). But there appears to be no direct connection between chemical nature of the surface (i.e. the individual chemical groups of the particle surface) and the properties which the black confers on the rubber. (see *Blow*, supra at pg 186).

Experimental results with N234, N251, N375 and N220 blacks showed that an increasing rolling loss coefficient caused by increasing the nitrogen surface area of the black gave a correlation coefficient of 0.97. A similar statement may be made regarding the $I_2$ No. and tinting strength of blacks. No such meaningful correlation was found with compressed DBP values of the blacks. Dry traction results showed a poor correlation with rolling loss, but did correlate well with $I_2$ No. and tinting strength. (see "The Effects of Carbon Black on Rolling Resistance of a Tire Tread Compound" by J. R. West et al. *Rubber Chemistry and Technology*, supra, at pg 509).

Not surprisingly, there is no indication in either of the immediately foregoing references that surface activity of the blacks tested may have any noteworthy or desirable effects with respect to a combination of traction, abrasion resistance and handling, despite the expected high rolling loss of a tire having a tread made from a high structure black with a superfine particle size and a relatively contaminated surface (indicated by a relatively lower $I_2$ No.). More particularly, there was no indication that the "volatiles" or contamination on the surface (as measured by $I_2$ No.) of a high surface area, high structure black, might be of great significance with respect to providing excellent handling, traction and abrasion resistance.

SUMMARY OF THE INVENTION

It has been discovered that a superfine carbon black having high structure and a relatively contaminated (high volatiles) surface as indicated by its iodine number, may be used in an amount in excess of 50 parts per hundred parts (phr) of a predominantly SBR rubber in an oil-extended tread compound, to provide excellent abrasion resistance, traction and handling characteristics sought in a high performance tire.

More particularly, it has been discovered that a predominantly SBR tire tread may be reinforced with a special high structure carbon black designated herein as a N103, having a superfine particle size smaller than about 20 nanometers (nm), a DBPA greater than 120 cm$^3$/100 g carbon black, and an $I_2$ No. in the range from 130–160 mg/g, in an oil extended tread compound in which there is at least 30 parts of processing oil per 100 parts of rubber; and the presence of this N103 black in a major amount relative to the total amount of high structure black, is essential.

The special N103 black may be used by itself or in a blend with another high structure black, for example a N220 black, provided in such blend the N103 is present in a major amount by weight of the total carbon black.

It is therefore a general object of this invention to provide a high performance radial tire characterized by excellent handling and traction and relatively high rolling resistance, all attributable to a tread compound comprising, (a) 100 parts by weight (wt) of rubber hydrocarbon at least 70 parts by wt of which is styrene-butadiene copolymer rubber (SBR);

(b) at least 30 parts, and up to 60 parts by wt of processing oil per 100 parts of rubber; and, (c) at least 50 parts, and up to 100 parts by wt of a high structure carbon black per 100 parts by wt rubber, a major portion by wt of which carbon black is a special N103 black having a primary particle size smaller than 20 nanometers (nm), a DBPA greater than 120 cm$^3$/100 g carbon black, and a relatively high level of volatiles as measured by an iodine number ($I_2$ No.) in the range from 130 to 160 mg/g;

so as to provide said tire with high performance handling characteristics, including improved steering response, swingout, plowing, linearity, on-center feel-tracking, returnability, lift-throttle oversteer, cornering stability and turn in.

DETAILED DESCRIPTION OF PREFERRED EMBODIMENTS

Figure 1:
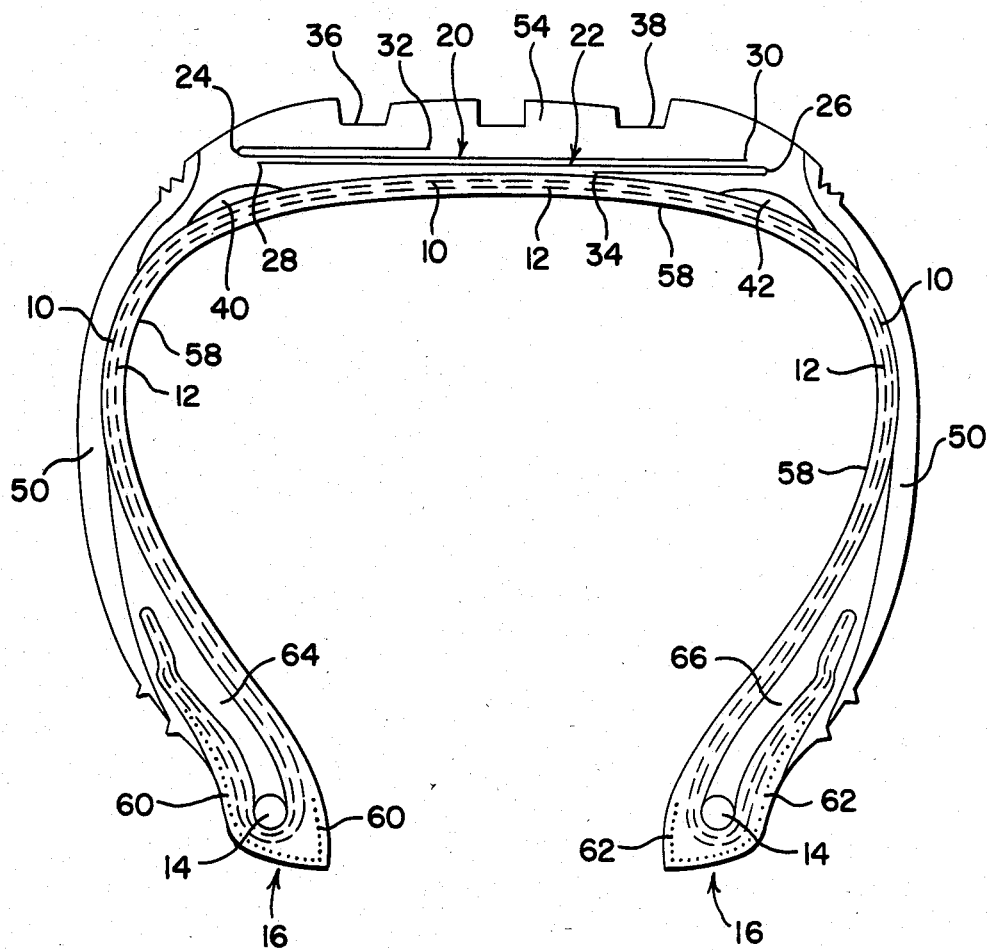
FIG. 1 of the drawing is a schematic illustration of a typical tubeless radial high performance passenger car tire in cross sectional view, illustrating how the novel tread compound of this invention is incorporated into the tire having a belt comprising folded glass fiber belts having alternating cord angles in the shoulder region of the tire.

In its most preferred embodiment this invention relates to radial tires particularly for automobiles, where superior handling is a requirement. The invention particularly relates to the contribution of the tires' tread to excellent traction, so as to inculcate confidence in the driver, and provide him relative safety under difficult or extreme driving conditions.

As traction is closely related to the handling characteristics of a high performance tire, it was to be expected that a superfine particle size carbon black would provide excellent reinforcing. It is generally recognized that particle size is the most important feature of carbon black, though both structure and porosity have a direct effect on certain rubber properties.

N220 is a high surface area carbon black which has been used for high traction and abrasion resistance but desirable levels (by wt) of N220 or other superfine black, results in undesirable difficulty in processing and reduces the oil extension potential of the tread rubber. Further, properties of the vulcanizate generally considered non-beneficial, particularly heat build-up and hardness, are exacerbated.

Thus the choice of a special superfine carbon black was predicated upon its use at a desirable level, in an amount greater than 50 phr (parts per 100 parts rubber), which is sufficient to provide superior reinforcing, high oil extension and acceptable processing and vulcanizate properties despite higher than normal heat build-up and increased rolling loss.

This choice of a special high structure carbon black designated N103 and available from Cabot Corporation under the designation CRX1297 carbon black, has superfine primary particles in the size range from about 10 to about 20 nm and an $I_2$ No. in the range from 130 to 160 mg/g (milligrams of iodine per gram of black), which range is critical in the formulation of the tread compound. This N103 carbon black was found to have a unique surface activity attributable to the volatiles and/or extractable material on its high surface area. These 'volatiles', in turn, block adsorption of iodine, as can such oxygen as may be present, and are regarded herein as contaminants which appear to be closely related to the total heat history of the carbon black and the process by which it was produced.

It is recognized that HV3396 is a special purpose superfine carbon black which provides excellent traction but it is impractical for general commercial use for several reasons, amongst which are difficult processability and high cost. The N103 is preferably a SAF (super abrasion furnace) black which has a DBPA (measured as specified in ASTM D2414) above 120 cm$^3$/100 g, an ASTM tint above 130, a CTAB above 135 m$^2$/g and an I$_2$ No. preferably in the range from 130 to 140 mg/g. Though N121 and N110 each has generally smaller primary particle sizes than N299 (which is the general purpose tread "GPT" carbon black), only N103 produces the excellent handling characteristics in the amounts used herein, when oil extended as specified hereinafter. The preferred amount of high structure carbon black to be used is in the range from about 70 to 90 phr, and all the carbon black is high structure. Most preferred is a carbon black content in the range from about 75 to 85 phr.

A comparison of the measured surface area properties is presented in Table I below.

TABLE I

| Property | CARBON BLACK PROPERTIES | | | | | |
| --- | --- | --- | --- | --- | --- | --- |
| | N299* | N121 | N110 | N103 | HV3396 | N220 |
| CTAB | 104 | 121 | 126 | 143 | 150 | 116 |
| I$_2$ adsorption | 108 | 140 | 140 | 135 | 180 | 120 |
| Tint | 113 | 120 | 124 | 134 | 138 | 115 |
| DBPA | 125 | 130 | 113 | 128 | 135 | 111 |

*control, GPT black

After rubber and carbon black, another essential ingredient present in a large amount in the tread compound is processing oil. The amount of processing oil used is not narrowly critical provided it is always present in an amount greater than 30 parts and up to about 60 parts by wt per 100 parts of rubber ('phr'), and more preferably in the range from about 35 to about 50 phr. The processing oil may be aromatic, naphthenic, and/or paraffinic oil, the last being least preferred. At levels in the most preferred range of from 40 to 45 phr, the heat build-up is much greater than that encountered in conventional tires, but this build-up is kept at an acceptable level this being the trade-off for excellent traction and abrasion resistance.

For comparison purposes, a control tread recipe was used in which the carbon black was GPT black (N299) present in the same amount by wt, namely 80 parts per 100 parts rubber, as in the various recipes in which other high structure, high surface area blacks listed in Table I were used. In the control tread recipe herebelow, only 37 parts by wt of processing oil were used. Thus, each test recipe had the same composition of ingredients except for the identity of the carbon black, so that the effects of particular blacks on the properteis of the tread, and the handling of the tire made with each tread, could be tested. The ratio of SBR/BR, namely 80/20, in the recipe was selected because of the known superior properties with respect to providing good handling characteristics, compared with compounds in which there is a minor proportion by wt of SBR in the rubber. Therefore, this invention is specifically directed to tread compounds having rubber containing at least 80 phr of SBR.

| TREAD COMPOUND RECIPES | | |
| --- | --- | --- |
| Ingredients | Control | Experimental |
| Styrene Butadiene Copolymer Rubber | 80 | 80 |
| Cis-Polybutadiene Rubber | 20 | 20 |
| zinc oxide | 3 | 3 |
| Fatty Acid | 2 | 2 |
| Antioxidants + Antiozonants | 4 | 4 |
| Vulcanizing Agents | 3.6 | 3.6 |
| Processing Oil | 37.0 | 37.0 |
| Carbon Black | 80.* | 80.0** |

*GPT black N299.
**test blacks in recipe

Numerous tread compounds were analogously formulated containing at least 80 phr SBR, and up to "SBR only" (that is, 100 phr SBR). These tread compounds were used to form tire treads which were incorporated into radial tubeless pneumatic tires of conventional folded belt, and non-folded belt, construction. Such tires generally comprise a flexible cord carcass or body to resist the pressure of the inflation gas, terminated at each side edge by a bead which engages the rim of a wheel. The cords are embedded in rubber, are protected from abrasion by tread and sidewall rubber, and are made to hold air by preferably having an integral essentially impervious liner on the interior of the carcass.

In one preferred embodiment the tread composition is used to prepare a tread for a pneumatic radial tire comprising two spaced inextensible beads, a ground contacting tread portion, a pair of individual sidewalls extending radially inward from the axial outer edges of said tread portion to join the respective beads, a carcass portion having at least one ply of rubberized cords lying essentially in radial planes wherein said cords are wrapped around said beads, a circumferential belt comprising at least two plies of rubber-coated fiberglass cords with the cords in each ply parallel to each other and at an angle to the circumferential central plane of the tire and with the tire cords in only ply extending in a direction opposite to the cords in the adjacent ply, wherein each said belt ply has at least one marginal edge that is folded.

In greater detail, FIG. 1 of the drawing schematically illustrates a tire having two plies of carcass cords 10 and 12, which may be of high-tenacity rayon, polyester or other suitable material, lying with the individual rubberized cords essentially in radial planes. The edges of the plies are suitably wrapped around inextensible bead grommets 14 forming part of the molded beads 16 shaped for engagement with a standard rim.

The radial cord plies 10 and 12 in the crown of the tire, which is the region capable of engaging the road, are surrounded by a folded circumferential glass fiber belt which, in this instance, is shown as consisting of two folded plies 20 and 22. The glass cords in each ply are parallel to each other and at an angle to the circumferential central plane of the tire, and the cords in ply 20 extend in a direction opposite to the cords in ply 22. Each marginal edge 24 and 26 of plies 20 and 22 respectively is a folded edge. Each folded marginal edge, 24 and 26 of ply 20 and 22, is located from about 0.5 to about 2.0 cm. axially outward of the cut end (28 and 30), of ply 22 and 20 respectively. It is necessary to have the axially outermost part of the belt be a folded edge to enance durability. Folded edges have less tendency to separate from the rubber coating than do cut edges. The belt plies 20 and 22 of FIG. 1 are folded such that adjacent layers of belt plies are alternating in cord angle in the shoulder region of the tire. When the alternating layers in the shoulder region have different cord angles, there is more reinforcement and, therefore, a stiffer shoulder area of the tire. This stiffness results in improved handling characteristics in the tire.

The folded end 32 and 34 of belt plies 20 and 22, respectively, terminate at points axially inward of outermost grooves 36 and 38. This helps to prevent breaking the glass cords. Under certain driving conditions (e.g., low speeds and frequent turning), glass cords have a tendency to break under the outermost grooves; therefore, by ending the folded ply axially inward of the groove, the belt is stiffer in the area of the groove, thereby resulting in less flexing and less glass breakage.

Belt plies 20 and 22 have a cord angle of from about 15 to about 25 degrees relative to the circumferential centerline of the tire. If the angle is less than 15 degrees, then the belt is not stiff enough to resist deflection in the shoulder region; and, if greater than 25 degrees, then the fold is too sharp, thereby leading to glass breakage at the fold.

A pair of belt-edge cushions 40 and 42 are located radially inward of the belt edges. The belt-edge cushions 40 and 42 are made from suitable rubber compounds which are well known in the art and and to the tread composition.

A protective layer of rubber compeltely surrounds the tire. This is preferably composed of a moderate thickness of sidewall rubber 50 in the zones where intense flexing occurs, and a thick layer of tread rubber 54 for resisting road wear. The tread layer has a suitable nonskid pattern of slits, slots, grooves and the like.

On the inner face of the tire is a liner 58 composed of a rubber material having resistance to diffusion of air such as butyl rubber, or halogenated butyl rubber, and/or blends thereof, and extending from one bead 16 to the other bread so as to seal against the rim and minimize the loss of inflation gas or its penetration into the body of the tire.

Located in the bead area of the tire is a pair of nonwicking finishing strips 60 and 62. These finishing strips serve to prevent bead chafing and to further stiffen the bead area and lower sidewall of the tire. Also located in the bead area are bead fillers 64 and 66. These fillers serve to increase lower sidewall stiffness, thereby giving improved vehicle handling properties.

In another preferred embodiment the tread composition is used to prepare a tread for a pneumatic radial tire two spaced inextensible beads, a ground contacting tread portion, a pair of individual sidewalls extending radially inward from the axial outer edges of said tread portion to join the respective beads, a carcass portion having at least one ply of rubberized cords lying essentially in radial planes wherein said cords are wrapped around said beads, an integral air impervious innerliner disposed inwardly of said carcass portion, a circumferential belt comprising at least two plies of low extensible cords with the cords in each ply parallel to each other and at an angle to the circumferential central plane of the tire and with the cords in one ply extending in a direction opposite to the cords in the other ply.

Figure 2:
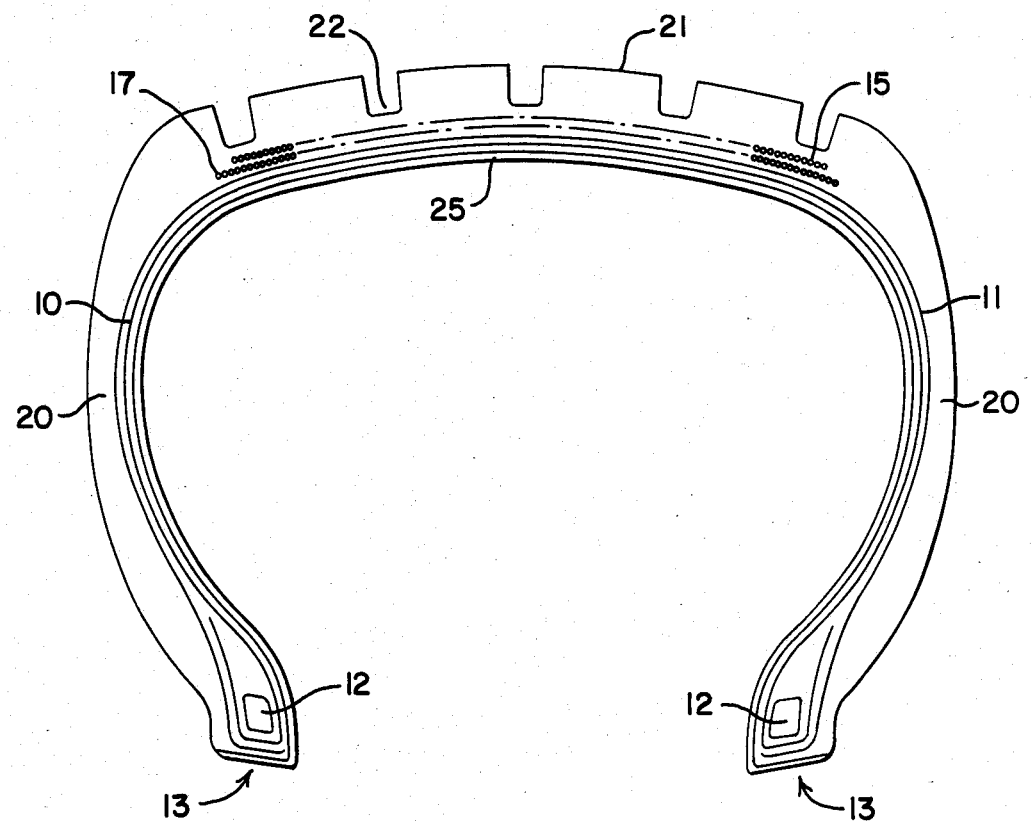
FIG. 2 of the drawing is a schematic illustration of another typical high performance tire in cross sectional view, utilizing the tread compound in the tread of a tire having a belt comprising non-folded steel cord belts. The reference numerals referring to features or elements in one figure are independent of those numerals referring to the other figure.

Referring now to FIG. 2 of the drawing, there is schematically illustrated two plies of carcass cords 10 and 11, which may be made from high-tenacity rayon, polyester, or other suitable material. The plies lie with the individual rubberized cords essentially in radial planes. The edges of the plies are suitably wrapped around inextensible bead grommets 12 forming part of molded beads 13 shaped for engagement with a standard rim.

The radial cord plies 10 and 11 in the crown of the tire, which is the region capable of engaging the road, are surrounded by a circumferential belt, which in this instance is shown as consisting of two strips of steel cords but could be four folded rayon or glass fiber belts, or belts of other low extensible material such as aromatic polyamide fibers also known as "aramid" fibers. The steel cord belt plies 15 and 17 are preferably prepared with the cords in each ply parallel to each other and at an angle to the circumferential central plane of the tire, the cords in one ply extending in a direction opposite to the cords in the other ply. This angle in the finished tire may be about 15° to 30° relative to the circumferential central plane. The two crown plies form an essentially inextensible belt around the radial cord plies.

On the inner face of the tire is a liner 25 composed of a rubber material having resistance to diffusion of air such as butyl rubber, or halogenated butyl rubber, and/or blends thereof, and extending from one bead 13 to the other bead so as to seal against the rim and minimize the loss of inflation gas or its penetration into the body of the tire.

A protective layer of rubber completely surrounds the tire. This is preferably composed of a moderate thickness of sidewall rubber 20 in the zones where intense flexing occurs, and a thick layer of tread rubber 21 for resisting road wear. Tread rubber 21 is located such that it is in the road contact area of the tire. The tread layer has a suitable nonskid patter 22 of slits, slots, grooves and the like.

In addition to the rubber, processing oil and carbon black itemized above, the novel tread compound must contain vulcanizing agents in sufficient quantity to vulcanize the rubber compound properly. The amounts and types of vulcanizing agents suitable for use in the invention are well known in the art. A typical vulcanization system would be a combination of sulfur and sulfenamide accelerators.

Many compounding ingredients may be used in the novel tread composition other than rubber, oil, carbon black, and vulcanizing agents. Such ingredients include activators such as zinc, calcium, and magnesium oxide, fatty acids such as stearic and lauric acid, and salts thereof such as cadmium, zinc, and copper sterate and lead oleate. Antioxidants, antiozonates, waxes, and stabilizers may be used in the novel compositions.

The compounding ingredients are added to the rubber using internal mixers such as Banbury mixers, two-roll mills and the like. The sulfur and accelerators are added to the rubber mix near the end of the mixing cycle to minimize premature vulcanization.

Tires may be produced with the tread of this invention by employing conventional radial tire fabrication procedures, which are well known in the art. Once the tire is built, it is vulcanized in a press using standard tire curing procedures and conditions which are also well known in the art.

The handling characteristics of a tire are quite readily recognized by one accustomed to driving under demanding conditions, but these characteristics are not quantiatively readily defined, objectively. In sum, these characteristics are judged by comparison with other comparable tires, on the same car, and driven by the same driver, over identical courses, using a prescribed identical pattern of driving requirements. Each of the various categories of characteristics, which in sum are referred to as the "handling characteristics", are evaluated by each driver on a scale of 10 points, a 10 indicating "perfect". Traction and rolling resistance, on the other hand, are readily measured by well known tests.

The main individual characteristics which, in toto, are instrumental in giving the car good handling, are generally acknowledged to be the following, which are listed hereunder with their definitions as the terms are used by those skilled in the art of testing such characteristics.

Steering Response: The response of the vehicle to driver steering input. Includes both the magnitude of steer angle needed to perform a given maneuver and the time of response of the vehicle to the driver's steering input.

Swingout: The loss of cornering capability of the rear of the vehicle. Rating includes both the magnitude and controllability of the rear end breakaway.

Plowing: The loss of cornering capability of the front of the vehicle. Rating includes both the magnitude and controllability of the front end breakaway. Additional steering input does not produce additional lateral acceleration.

Lift-Throttle Oversteer: The change in attitude of the car during steady state cornering due to lifting off the throttle. This generally causes the car to shift to a more oversteer (rear end swingout) attitude and can be used to steer the car with the throttle in a corner. This rating only rates the amount of lift throttle oversteer exhibited. The higher the rating number the less lift-throttle oversteer is exhibited.

Cornering Stability: The evaluator's overall impression of the stability of the vehicle during cornering. It is an indication of the comparative ease with which the vehicle can be driven at its cornering limit.

Turn-in: The ability to turn the front end of the car into the initial portion of a corner. Emphasizes the transient response of the vehicle.

Transient Stability: The evaluator's overall impression of the stability of the vehicle during a transient-accident avoidance maneuver.

Braking: The ability of the vehicle to slow down or stop. Rating includes both the magnitude of the deceleration and the ease of which the driver can modulate the brakes near the peak braking point.

The following three parameters can be evaluated on the street and are evaluated at very low cornering levels. They are not evaluated during the maximum handling testing on the track or autocross.

Linearity: The ability of the vehicle to respond linearly to the driver's steering input at low cornering levels.

Tracking: The ability of the vehicle to maintain a straight ahead attitude on level pavement without excessive driver corrections.

Returnability: The ability of the vehicle to return to a straight ahead attitude quickly and linearly with a minimum of oscillation after small steering inputs are introduced, and then released by the driver.

The following Table I sets forth the average ratings for each category of handling characteristic, as assessed quantitatively by different drivers comparing tires of identical construction except that the control tires have treads made with the tread composition identified as "control" in Tread Recipes, and the experimental tread composition is used in the treads of the other sets of tires. Each category is rated on a scale of 10, a rating of "10" being perfect. Certain categories are evaluated on a race track or autocross, referred to in the Table I as "Track", other categories are tested with a Double Lane Change test, referred to as "DLC", and still others (the first three) are evaluated both on the track and with a DLC test.

The double lane change test is executed at specified speeds at which the car travelling in a straight line along one lane, is quickly diverted to cross over two lanes and then returned to the original lane in its original line of travel in a predetermined period of time.

TABLE I

COMPARATIVE HANDLING CHARACTERISTICS

| Category | Control DLC | Control Track | Experimental DLC | Experimental Track |
|---|---|---|---|---|
| Steering Response | 6 | 5.75 | 6.5 | 7 |
| Swingout | 5.5 | 6.25 | 7. | 6.5 |
| Linearity | 7 | | 7.5 | |
| On-center feel-tracking | 7 | | 7 | |
| Returnability | 7 | | 7 | |
| Lift-throttle oversteer | | 7.75 | | 8 |
| Cornering stability | | 5.75 | | 7 |
| Turn in | | 6 | | 6 |

As is evident from the data in Table I each of the categories in the comparison, the experimental tires were always at least as highly rated as the control, most categories being more favorably rated. In other words, the experimental tires were deemed to have better handling characteristics in most of the categories, and were deemed as good in the others.

The following Table II lists comparative measurements for wet and dry traction at various speeds for sets of control tires listed as "Control 1" and "Experimental 1" these being tires having treads of compositions identified as control and experimental in the Tread Recipes hereinbefore; and, for sets of tires listed as "Control 2" and "Experimental 2" in which the compositions were the same except for the SBR content which was "SBR only", that is, 100 SBR.

In Table II, all numbers not in parentheses are measured for two tires with treads of the control and experimental compounds respectively, according to the standard General Motors test procedure TWS 1-100 for evaluation of traction set forth in the "GM Tire Performance Criteria Procedures and Specifications Manual" supplied to tire manufactureres. The numbers in parentheses are indexed values, indexed to the ASTM standard which rates 100. All numbers represent the average of the two tires tested, and all tires are 205/60HR13 P788T size. The indexed numbers for the experimental tires 1 and 2 are indexed in relation to the controls 1 and 2 respectively, by dividing the value for the experimental tire by the value for the control.

TABLE II

| WET AND DRY TRACTION (combined peak and slide) | | | |
|---|---|---|---|
| | WET | | DRY |
| | 20 mph | 60 mph | 40 mph |
| Control 1 | 107.8 (100) | 145.3 (100) | 84.6 (100) |
| Experimental 1 | 117.2 (109) | 137.0 (94) | 90.6 (106) |
| Control 2 | 110.2 (100) | 126.3 (100) | 89.2 (100) |
| Experimental 2 | 122.9 (112) | 136.6 (108) | 92.0 (103) |

From the foregoing wet and dry traction data, it is evident that the traction of the experimental tread compounds, whether each contains 80 parts SBR, or 100 parts SBR, in otherwise identical recipes, provides better results than the controls having the same amount by wt of N299 carbon black.

Tread wear of the control and experimental tires was compared by driving two tires having treads of each composition on an asphalt test track at simulated highway conditions. The values given are the projected miles index which is the average for two tires. The values in the first column are for all grooves across the width of the tread, and designated "All Grooves". The values in the second column are those for the Fastest Wearing Grooves designated FWG. Actual driving conditions were used because the results obtained by laboratory testing for tread wear are not as reliable.

TABLE III
TREAD WEAR COMPARISON

| Tire designation | All grooves | FWG |
| --- | --- | --- |
| Control 1 (80/20 SBR/BR; 80 N299/37 oil) | 43600 (100) | 36550 (100) |
| Exp'tal 1 (80/20 SBR/BR; 80 N103/37 oil) | 48600 (100) | 44000 (120) |
| Exp'tal 2 (80/20 SBR/BR; 80 N103/44 oil) | 46350 (104) | 42600* (123) |
| Exp'tal 3 (80/20 SBR/BR; 80 N103/50 oil) | 45100 (101) | 39450 (114) |
| Control 2 (100 SBR; 80 N299/37 oil) | 37800 (100) | 28500 (100) |
| Exp'tal 4 (100 SBR; 80 N103/37 oil) | 39700 (111) | 30250 (106) |

*fastest wearing groove was in the crown of both tires; all others had the notch opposite the serial number side, that is, the outermost grooves relative to the central vertical plane through the test vehicle, as the fastest wearing groove.

It is evident from the foregoing data in Table III that the abrasion resistance of the experimental tires is about 10% better than that of the controls using N299 black. As is also evident, abrasion resistance gets progressively worse with increasing oil content. Least tread wear, that is, best abrasion resistance is obtained with an SBR only tread rubber composition.

We claim:

1. In a tubeless pneumatic radial tire comprising two spaced inextensible beads, a ground contacting tread portion, a pair of individual sidewalls extending radially inward from the axial outer edges of said tread portion to join the respective beads, a carcass portion having at least one ply of rubberized cords lying essentially in radial planes wherein said cords are wrapped around said beads, a circumferential belt comprising at least two plies of rubber-coated fiberglass cords with the cords in each ply parallel to each other and at an angle to the circumferential central plane of the tire and with the tire cords in one ply extending in a direction opposite to the cords in the adjacent ply, wherein each said belt ply has at least one marginal edge that is folded wherein the tread composition comprises, (a) 100 parts by weight (wt) of rubber hydrocarbon at least about 70 parts by wt of which is styrene-butadiene copolymer rubber (SBR);

(b) at least 30 parts, and up to 60 parts by wt of processing oil per 100 parts of rubber; and, (c) at least 50 parts, and up to about 100 parts by wt of a high structure carbon black per 100 parts by wt rubber, a major portion by wt of which carbon black is a special N103 black having a primary particle size smaller than 20 nanometers (nm), a DBPA greater than 120 cm$^3$/100 g carbon black, and a relatively high level of volatiles as measured by an iodine number ($I_2$ No.) in the range from 130 to 160 mg/g;

so as to provide said tire with high performance handling characteristics, including improved steering response, swingout, plowing, linearity, on-center feel-tracking, returnability, lift-throttle oversteer, cornering stability and turn in.

2. The tire of claim 1 wherein said rubber hydrocarbon of said tread consists essentially of from about 70 parts to 100 parts SBR, the remainder, if any, being cis-polybutadiene (BR) rubber.

3. The tire of claim 1 wherein said processing oil is present in an amount in the range from 40 to 50 parts by wt per 100 parts by wt of said rubber.

4. The tire of claim 3 wherein said carbon black is present in the range from about 70 parts to about 90 parts by wt per 100 parts by wt of said rubber.

5. The tire of claim 4 wherein said N103 is the sole carbon black present in an amount about 80 parts per 100 parts of said rubber.

6. The tire of claim 4 wherein said N103 has a dibutylphthalate absorption (DBPA) greater than 120; an ASTM tint greater than 130; cetyl trimethyl ammonium bromide (CTAB) adsorption in excess of 135; and an iodine number ($I_2$ No.) in the range 130 to 160.

7. A tire tread composition comprising, (a) 100 parts by weight (wt) of rubber hydrocarbon at least about 70 parts by wt of which is styrene-butadiene copolymer rubber (SBR);

(b) at least 30 parts, and up to 60 parts by wt of processing oil per 100 parts of rubber; and, (c) at least 50 parts, and up to about 100 parts by wt of a high structure carbon black per 100 parts by wt rubber, a major portion by wt of which carbon black is a special N103 black having a primary particle size smaller than 20 nanometers (nm), a DBPA greater than 120 cm$^3$/100 g carbon black, and a relatively high level of volatiles as measured by an iodine number ($I_2$ No.) in the range from 130 to 160 mg/g; and, (d) sufficient curing agents to effect vulcanization.

8. The tread composition of claim 7 wherein said rubber hydrocarbon of said tread consists essentially of from about 75 parts to about 90 parts SBR and the remaining is cis-polybutadiene.

9. The tread composition of claim 7 wherein said processing oil is present in an amount in the range from 40 to 50 parts by wt per 100 parts by wt of said rubber.

10. The tread composition of claim 7 wherein said carbon black is present in the range from about 70 parts to about 90 parts by wt per 100 parts by wt of said rubber.

11. The tread composition of claim 7 wherein said N103 is the sole carbon black present in an amount about 80 parts per 100 parts of said rubber.

12. The tread composition of claim 7 wherein said N103 has a dibutylphthalate absorption (DBPA) greater than 120; an ASTM tint greater than 130; cetyl trimethyl ammonium bromide (CTAB) adsorption in excess of 135; and an iodine number ($I_2$ No.) in the range 130 to 160.

* * * * *